US012165500B2

(12) United States Patent
Li et al.

(10) Patent No.: US 12,165,500 B2
(45) Date of Patent: Dec. 10, 2024

(54) METHOD AND SYSTEM FOR DETERMINING COASTAL EROSION DISASTER EARLY WARNING LINES AND CALCULATING SPATIAL SCOPE THEREOF

(71) Applicant: First Institute of Oceanography, Ministry of Natural Resources, Qingdao (CN)

(72) Inventors: Ping Li, Qingdao (CN); Jun Du, Qingdao (CN); Guoqiang Xu, Qingdao (CN); Wenwen Yan, Qingdao (CN); Ziwen Tian, Qingdao (CN)

(73) Assignee: FIRST INSTITUTE OF OCEANOGRAPHY, MINISTRY OF NATURAL RESOURCES, Qingdao (CN)

( * ) Notice: Subject to any disclaimer, the term of this patent is extended or adjusted under 35 U.S.C. 154(b) by 0 days.

(21) Appl. No.: 18/532,894

(22) Filed: Dec. 7, 2023

(65) Prior Publication Data
US 2024/0355193 A1    Oct. 24, 2024

(30) Foreign Application Priority Data

Apr. 20, 2023    (CN) .......................... 202310422686.2

(51) Int. Cl.
*G08B 31/00*    (2006.01)
*G01C 13/00*    (2006.01)
(Continued)

(52) U.S. Cl.
CPC ........... *G08B 31/00* (2013.01); *G01C 13/006* (2013.01); *G01C 13/008* (2013.01); *G06F 30/20* (2020.01); *G08B 21/10* (2013.01); *G06F 2111/10* (2020.01)

(58) Field of Classification Search
CPC .... G01C 13/006; G01C 13/004; G01C 13/00; G01C 13/002; G01C 13/008; G01C 5/06;
(Continued)

(56) References Cited

U.S. PATENT DOCUMENTS 5,700,108 A * 12/1997 Bishop .................... E02B 3/046
405/21
2011/0299927 A1* 12/2011 McCormick ............ E02B 3/062
405/27

FOREIGN PATENT DOCUMENTS

CN    108653157 A    10/2018
CN    111401753 A *  7/2020 ....... G06Q 10/06393
(Continued)

OTHER PUBLICATIONS

Qin Lu, "Stability study of muddy coasts of the abandoned Yellow River Delta," China Master's Thesis Full-text Database Basic Science Edition, Issue 4, Apr. 30, 2011, 73 pages, with English abstract (see pp. 3-4).
(Continued)

*Primary Examiner* — Andre J Allen
(74) *Attorney, Agent, or Firm* — MUNCY, GEISSLER, OLDS & LOWE, P.C.

(57) ABSTRACT

A method and system for determining coastal erosion disaster early warning lines and calculating spatial scope thereof. The method includes determining a coastal erosion rate according to coastal erosion change monitoring data and landform data; and calculating at least one coastal erosion early warning line in coming N years in conventional conditions according to an established coastal erosion rate calculation method; determining the at least one coastal erosion early warning line in N years in extreme conditions by increasing influencing factors of accelerated sea level rise and extreme storm waves and utilizing a determination and calculation method of coastal erosion disaster early warning
(Continued)

lines; and obtaining a coastal erosion retreat position and scope and sending early warning based on the coastal erosion rate in conventional conditions and the at least one coastal erosion early warning line in extreme conditions.

2 Claims, 5 Drawing Sheets

(51) Int. Cl.
*G06F 30/20* (2020.01)
*G08B 21/10* (2006.01)
*G06F 111/10* (2020.01)

(58) Field of Classification Search
CPC .......... G01C 17/34; G01C 25/00; G01C 5/04; G01C 9/00; G01C 9/06; G01C 9/14; G01C 9/18; G01C 21/16; G01C 21/185; G01C 21/203; G01C 9/12; G08B 21/10; G08B 19/02; G08B 21/02; G08B 21/00; G08B 21/182; G08B 25/08
USPC .......................................... 73/170.29–170.34
See application file for complete search history.

(56) References Cited

FOREIGN PATENT DOCUMENTS

| CN | 111461046 B | * | 12/2020 | |
| CN | 113628227 A | | 11/2021 | |
| CN | 215525006 U | * | 1/2022 | |
| CN | 116797019 A | * | 9/2023 | |
| CN | 117516636 A | * | 2/2024 | ............ G01D 21/02 |
| CN | 117555031 A | * | 2/2024 | |
| CN | 117764465 A | * | 3/2024 | |
| CN | 117975270 A | * | 5/2024 | |
| KR | 20240078253 A | * | 6/2024 | |

OTHER PUBLICATIONS

Yong Liu et al., "Coastal erosion and its cause analysis in different spatial temporal scales based on multi sources data in Dongshan Island of Fujian Province," Haiyang Xuebao, Issue 3, Mar. 15, 2016, 13 pages, with English abstract (see p. 13).
First Search issued in corresponding CN Application 202310422686.2, dated May 31, 2023, 4 pages, with English translation.
First Office Action issued in corresponding CN Application 202310422686.2, dated May 31, 2023, 33 pages, with English translation.
Second Office Action issued in corresponding CN Application 202310422686.2, dated Jul. 10, 2023, 42 pages, with English translation.
Notice of Refusal issued in corresponding CN Application 202310422686.2, dated Jul. 26, 2023, 27 pages, with English translation.
Notice of Allowance issued in corresponding CN Application 202310422686.2, dated Jan. 19, 2024, 7 pages, with English translation.
Supplemental Search issued in corresponding CN Application 202310422686.2, dated Jan. 12, 2024, 2 pages, in English.

* cited by examiner

METHOD AND SYSTEM FOR DETERMINING COASTAL EROSION DISASTER EARLY WARNING LINES AND CALCULATING SPATIAL SCOPE THEREOF

TECHNICAL FIELD

The present invention relates to the technical field of information monitoring for the coastal disaster prevention and management purpose, especially a method and system for determining coastal erosion disaster early warning lines and calculating spatial scope thereof.

BACKGROUND TECHNOLOGY

Coastal erosion is a typical and common kind of geological disaster in coastal areas. Coastal erosion can result in large-scale loss of land resources, damage of coastal formations, and may bring other environmental and geological problems. To enhance early warning of coastal erosion and manage disaster prevention is an important measure to reduce hazards and losses due to the disaster, that is, the disaster prevention and management work shall be transited from "after-disaster management" to "before-disaster prevention". By determining and calculating coastal erosion early warning lines under different circumstances, predicting coastal erosion grades and extents of disasters and losses in advance and implementing countermeasures for coastal erosion disaster management and prevention beforehand, loss due to the disasters can be reduced.

Quantitative calculation of coastal erosion rates can be done by measuring actual data of water depths and land forms and interpretation, comparison and judgment of remote-sensing imaging data, however, currently there is no method and system for outlining and calculating coastal erosion early warning lines in conventional change conditions and when being subjected to the influence of sea level rise and extreme storm waves available.

From the foregoing analysis, it can be known that, problems and defects with the prior art are that: currently, there is a lack of a quantitative method for calculating coastal erosion early warning lines so as to determine the tendency of coastal erosion disaster quantitatively and figure out corresponding objects that may be influenced. In the prior art, it is not possible to know exactly the location and scope of coastal erosion early warning lines in common conditions and extreme conditions (accelerated sea level rise and extreme storm waves) in view of coastal erosion features and situations and also early warning of coastal erosion disaster cannot be effectively realized.

SUMMARY OF THE INVENTION

To overcome the problem existing in the prior art, embodiments of the present invention provide a method and system for determining coastal erosion disaster early warning lines and calculating spatial scope thereof.

The technical solutions are: a method for determining coastal erosion disaster early warning lines and calculating spatial scope thereof comprises specifically the following steps:

S1, determining a coastal erosion rate according to coastal erosion change monitoring data and landform data; and calculating at least one coastal erosion early warning line in coming N years in conventional conditions according to an established coastal erosion rate calculation method;

S2, determining the at least one coastal erosion early warning line in N years in extreme conditions by increasing influencing factors of accelerated sea level rise and extreme storm waves and utilizing a determination and calculation method of coastal erosion disaster early warning lines; and S3, obtaining a coastal erosion retreat position and scope and sending early warning based on the coastal erosion rate in conventional conditions and the at least one coastal erosion early warning line in extreme conditions.

In the step S1, the established coastal erosion rate calculation method comprises:

(1) coastal erosion disaster data extraction: conducting extraction for data regarding changes of coastal lines and beach corrosion; and (2) coastal line change rate calculation: analyzing temporal changes of positions of the coastal lines by superposition comparison of multi-stage changes of the coastal lines or changes of elevations of mudflats, and calculating the coastal erosion rate in the conventional conditions by end-point methods or linear regression methods.

In the step (1), coastal erosion disaster data extraction comprises: taking cross-section lines perpendicular to the coastal lines as base lines, and reading positions of intersecting points of the base lines with the coastal lines in different periods, or measuring and obtaining distances between the coastal lines and monitoring signs;

and extraction of the data regarding the changes of beach corrosion comprises: taking an intertidal belt or an offshore slope to be a reference, drafting vertical lines downwards, reading respectively positions of intersecting points between the vertical lines and cross-section landform lines in the different periods; and in case water depths and landforms are digital elevation model (DEM), and extracting a topographical profile graph by being perpendicular to directions of the coastal lines.

In the step (2), coastal line change rate calculation comprises: determining the multi-stage changes of the coastal lines in different periods and times, when data of the coastal lines or the landform data in less than six stages are collected, calculating the coastal erosion rate by the end-point methods; and when the data of the coastal lines or the landform data in six or more stages are collected, calculating the coastal erosion rate by the linear regression methods.

In an embodiment, calculating the coastal erosion rate by the end-point methods comprises calculating the coastal erosion rate in conventional conditions by comparison of position changes taking use of data of the positions of the coastal lines in two different periods, wherein a calculation method is:

$$SER = \frac{D_1 - D_2}{T_1 - T_2};$$

In the above equation, SER means coastal erosion rate, $D_1$ means any of coastal line and bathymetric line or cross-section landform line at a time $T_1$; and $D_2$ means any of the coastal line, the bathymetric line or the cross-section landform line at a time $T_2$.

For the linear regression methods, a one-variable linear best trend line corresponding to all the data is obtained by the least squares method, a rate of slope of the one-variable linear best trend line is the coastal erosion rate in the conventional conditions; y is a position of the coastal line, the bathymetric line or the cross-section landform line to be calculated, x is a known initial position of the coastal line, the bathymetric line or the cross-section landform line and a calculation formula of the coastal erosion rate in the conventional conditions are:

$$y = a_0 + b_0 x;$$

$$\begin{bmatrix} i & \sum x_i \\ \sum x_i & \sum x_i^2 \end{bmatrix} \begin{bmatrix} a_0 \\ b_0 \end{bmatrix} = \begin{bmatrix} \sum y_i \\ \sum x_i y_i \end{bmatrix};$$

In the formula, $a_0$ is a fixed constant and is obtained by one-variable linear intercept calculation; $b_0$ is the coastal erosion rate in the conventional conditions; i is a number of stages of the data; $x_i^2$ is a multi-stage least square iterative estimation; $X_i$ is a position of the ith stage coastal line, bathymetric line or cross-section landform line and $y_i$ a position of the ith stage coastal line, bathymetric line or cross-section landform line to be calculated.

In the step S2, the method for determining and calculating coastal erosion early warning lines comprises the following steps:

Step 1, determining an initial position of the coastal lines and calculating and determining positions of the coastal erosion disaster early warning lines $S_N$ in N years; calculating the coastal erosion disaster early warning lines in extreme conditions, which is obtained by calculating the coastal erosion disaster early warning lines in conventional conditions and increasing influencing factors of sea level rise and extreme storm waves;

Step 2, calculating and determining the at least one coastal erosion early warning line $S_{Nc}$ under influence of accelerated sea level rise; and Step 3, determining and calculating the at least one coastal erosion early warning line $S_{Nc}$ under influence of extreme storm waves.

In the step 1, determining the position of the at least one coastal erosion disaster early warning line $S_N$ comprises, determining a reference line according to different types of coasts and landforms, wherein the reference line is selected from a high tide line, a boundary line of coastal cliffs and a vegetation line, a basic line is defined as a position of the coastal line at a time 0, and obtaining the position of the coastal line in N years by coastal line evolution rate×time; and the at least one coastal erosion early warning line of a corrosion coastal area at the Nth year comprises:

$$S_N = S_0 + SER \times N;$$

In the formula, $S_0$ is the position of the coastal line at the time 0; SER is the coastal erosion rate; $S_N$ is an estimated position of the coastal line assuming the coast evolves for N years at a certain rate; and N is a number of years.

In the step 2, calculating and determining the at least one coastal erosion early warning line $S_{Nc}$ under influence of accelerated sea level rise comprises, determining to include factors of sea level rise and extreme storm waves for calculation, and determining the determining and calculating method of the at least one coastal erosion early warning line in extreme conditions; calculating and determining the at least one coastal erosion early warning line $S_{Nc}$ under influence of accelerated sea level rise comprises: calculating an adjustment value $SLR_a$ resulted from accelerated sea level rise according to a sea level rise rate $SLR_p$ in a region and a predicted sea level rise value $SLR_N$ in the coming N years, wherein a calculation formula is as following:

$$SLR_a = SLR_N - SLR_p \times N;$$

In the formula, $SLR_a$ is the adjustment value of the sea level rise rate; $SLR_N$ is the predicted sea level rise value in fifty years, $SLR_p$ is the current sea level rise rate and N is the number of years;

when the sea level rise trend remains unchanged in N years, a calculation formula of a coastal line retreat value $R_a$ is:

$$R_a = \frac{SLR_a \times L}{h + D};$$

In the formula, $R_a$ is the coastal line retreat value, L is a measured horizontal distance of a cross section of a moving beach, h is a measured depth of a movement of sea sand in a wave field, and D is a measured height of a beach berm;

the at least one coastal erosion early warning line $S_{Nc}$ is obtained by the following equation:

$$S_{Nc} = S_N + R_a;$$

In the equation, $S_{Nc}$ is the at least one coastal erosion early warning line, $S_N$ is a landward retreat distance from $S_0$; and $R_a$ is the coastal line retreat value.

In the step 3, determination and calculation of the at least one coastal erosion early warning line $S_{Nc}$ under influence of extreme storms, comprising: upon determining an increasing value of the early warning line subjected to the extreme storms, an estimation formula for coastal retreat due to the extreme storms is:

$$I = HS \left( \frac{t_d}{12} \right)^{0.3};$$

In the formula, l is an amount of coastal retreat due to the extreme storms with a unit of ft; H is a measured and calculated nearshore wave height with a unit of ft; S is a measured and calculated storm surge with a unit of ft; and ta is a measured and calculated time duration of the extreme storms with a unit of h;

by calculation, obtaining the coastal line retreat value l due to periodic storms in N years, by adding to the at least one coastal erosion early warning line $S_{Nc}$; obtaining the coastal erosion early warning line $S_{Ns}$ including actions of storm waves:

$$S_{Ns} = S_{Nc} + l;$$

in the equation, $S_{Ns}$ is a location of the at least one coastal erosion early warning line when there are storms; $S_{Nc}$ is a location of the coastal line after ASLR randomization, and l is the calculated coastal line retreat value due to periodic storms in N years.

Another purpose of the present invention is to provide a system for determining coastal erosion early warning line and calculating spatial scope thereof, wherein the method for determining coastal erosion early warning line and calculating spatial scope thereof is executed, with the system the method for calculating the coastal erosion rate is determined, and a calculation method of the at least one coastal erosion early warning line in conventional conditions and extreme conditions is quantitatively determined, wherein the system comprises:

a conventional condition coastal erosion early warning line determination module, configured to calculate at least one coastal erosion early warning line in N years in conventional conditions according to coastal erosion change monitoring and landform data and with the method for calculating the coastal erosion rate, and determining the coastal erosion rate in conventional conditions;

an extreme condition coastal erosion early warning line determination module, configured to determine at least one extreme condition coastal erosion early warning line being subjected to accelerated sea level rise and extreme storm waves with the method for determining coastal erosion disaster early warning lines and calculating spatial scope thereof; and an early warning module, configured to obtain a coastal erosion retreat position and scope based on the at least one coastal erosion early warning line in conventional conditions and the coastal erosion early warning line in extreme conditions and sending early warning.

In view of the foregoing technical solutions, the advantages and positive effects of the present invention are: targeting at the technical problems existing in the prior art and the difficulties in addressing the problems, in combination with the technical solutions disclosed in the present invention and results and data obtained during researches, a deep and thorough analysis is given to how the present invention solves the technical problems and the inventive technical effects after addressing the technical problems are specifically described as following: with regard to an important kind of sea disaster—coastal erosion disaster, in light of the development process and trend of coastal erosion disasters, the present invention provides a method for determining coastal erosion disaster early warning line and calculating spatial scope thereof in order to reduce losses caused by the disaster and conduct early warning and prevention in advance. By quantitative calculation and prediction of development trend and position of the coastal erosion disaster in conventional conditions, and determining and calculating the coastal erosion early warning line under influence of sea level rise and extreme storm waves, according to the technical solutions in the present invention the coastal erosion early warning position is determined so as to realize before-disaster prevention and take countermeasure to manage the disaster in advance and reduce the losses due to the disaster effectively.

BRIEF DESCRIPTION OF DRAWINGS

The drawings are incorporated in the specification and form a part thereof, and in the drawings the embodiments of the present disclosure are given and the drawings are configured to explain principles of the present invention in conjunction with the specification.

Wherein: 1 conventional condition coastal erosion disaster early warning line determination module; 2 extreme condition coastal erosion disaster early warning line determination module and 3 early warning module.

EMBODIMENTS

In order to make the purposes, features and advantages of the present invention more clear and obvious, hereinafter a detailed description will be given to embodiments of the present invention in conjunction with the drawings. In the description a lot of details are set forth so as to understand the present invention fully. However, the present invention can be implemented in many methods other than those given here, those skilled in the art can make various modifications without departing from the essence of the present invention, therefore, the present invention is not limited by the specific embodiments disclosed herein. In an embodiment of the present invention, in view of coastal erosion development mechanisms and features and conditions of coastal erosion, the present invention provides a method for determining coastal erosion disaster early warning lines and calculating spatial scope thereof, and with the method, positions of the coastal erosion early warning lines in conventional conditions and extreme conditions (accelerated sea level rise and extreme storm waves) can be determined, and the conventional conditions defined in the present invention include all conditions other than accelerated sea level rise and extreme storm waves. By determining the coastal erosion retreat position and scope in different conditions, effective measured can be taken in advance and early warning of coastal erosion disaster can be done. Specifically, the method comprises: coastal erosion rate calculation: apparent differences are observed in coastal erosion strengths of erosion coastal sections, and based on erosion change monitoring and landform data, a calculation method of the coastal erosion rate based on an end-point method or the least square is proposed. On the basis of calculating the current coastal erosion conditions and processes, calculating the coastal erosion development trend in N years by making a coastal erosion evolution trend and mode, in further view of erosion disaster prevention and management ability, delimiting the coastal erosion early warning lines;

Determination and calculation of coastal erosion disaster early warning lines: based on the coastal erosion evolution theories and mechanisms, building a calculation formula of coastal erosion early warning lines against two important factors, namely, accelerated sea level rise and extreme storm waves, determining the coastal erosion early warning lines in N years and determining the method for determining and calculating the coastal erosion early warning line in condition of accelerated sea level rise and extreme storm waves.

Figure 1:
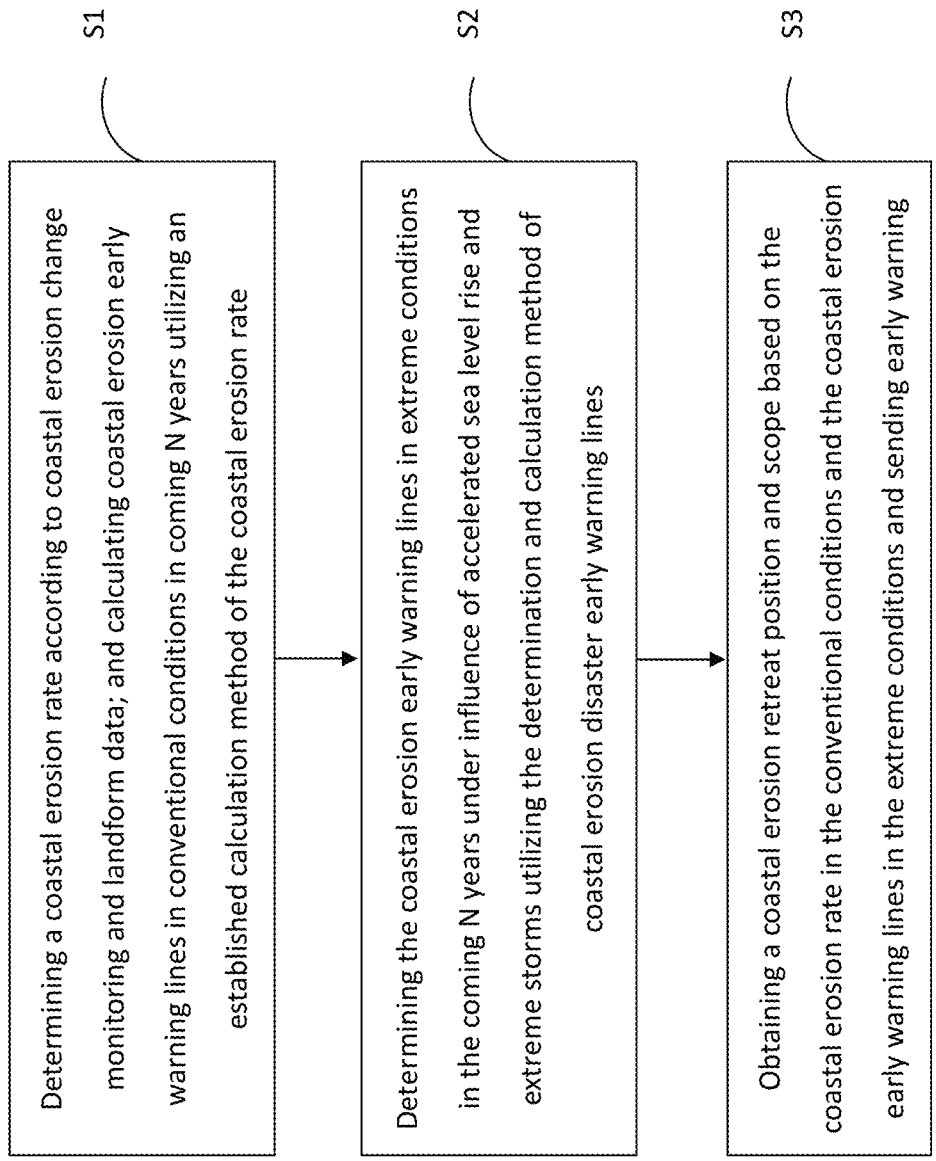
FIG. 1 is a flowchart diagram showing a method for determining coastal erosion disaster early warning line and calculating spatial scope thereof according to an embodiment of the present invention.

Embodiment 1, FIG. 1 discloses a method for determining coastal erosion disaster early warning lines and calculating spatial scope thereof according to an embodiment of the present invention, wherein, the coastal erosion rate calculation method is determined, the conventional condition coastal erosion disaster early warning line calculation method is determined quantitatively, and by increasing the factors of accelerated sea level rise and extreme storm waves, the extreme condition coastal erosion disaster early warning line determination and calculation method is determined; wherein the method comprises the following steps:

S1: determining the coastal erosion rate according to coastal erosion change monitoring and landform data; and calculating the coastal erosion disaster early warning lines in N years in conventional conditions with the established coastal erosion rate calculation method;

S2: determining the extreme condition coastal erosion disaster early warning lines in N years being subjected to influences of accelerated sea level rise and extreme storm waves and with the determination and calculation method of coastal erosion disaster early warning line; and S3: obtaining a coastal erosion retreat position and scope according to the conventional condition coastal erosion rate and extreme condition coastal erosion disaster early warning lines and sending early warning.

In an embodiment of the present invention, in the step S1, coastal erosion rate calculation, that is, coastal erosion and coastal erosion change rate calculation, comprising analyzing the seashore change rate statistically based on coastal lines of the erosion coastal sections and repeated monitoring results of monitoring sections, and by extraction and superposition comparison of the coastal lines at different times, periods, water depths, landforms and remote-sensing images. On this basis, calculating the coastal line erosion rate of the coastal erosion sections, judging the coastal erosion strength, and providing support for subsequent erosion development and evolution trend. The most outstanding features of coastal erosion are coastal line retreat and beach corrosion, thus for coastal erosion a magnitude of coastal line retreat and a changing amount of beach corrosion are taken as strength factors of coastal erosion disaster. In light of temporal comparability, the coastal line retreat rate and the beach corrosion rate are used to represent coastal erosion changes. Specifically, the method comprises the following steps:

(1) Coastal line erosion disaster data extraction: conducting coastal line change and beach corrosion change data extraction;

Wherein, for coastal line changes, making a cross line perpendicular to the coastal line as a base line, reading intercept points of the base line with the coastal lines at different times, or measuring a distance between the coastal lines and the monitoring sings according to the measurement; for beach corrosion, taking an intertidal belt or an offshore slope as a base line, drafting a vertical line downwards, and reading respectively positions of intercept points between the vertical line with the landform cross line at different times. If the water depths and the landforms are shown in digital elevation model (DEM), extracting cross-section landform diagrams by cut vertical to directions of the coastal lines, and calculating the beach corrosion rate in conventional conditions by the end-point method or the linear regression method as per step (2).

(2) Conventional condition coastal line change rate calculation. By a mathematical method of superposing changes of multi-stage coastal line positions and beach elevations for comparison, analyzing the changes of the coastal line positions by the time. Calculating the coastal erosion rate by the end-point method or the linear regression method. When less than six periods of coastal line or landform data in different times are used for calculation, calculating the coastal erosion rate by the end-point method; and when six or more periods of coastal line or landform data are used for calculation, calculating the coastal erosion rate by the linear regression method. Wherein for calculating conventional condition SER by comparison of position changes taking use of the end-point method with the coastal line position data at two different times, the calculating formula is:

$$SER = \frac{D_1 - D_2}{T_1 - T_2};$$

In the formula, SER is the coastal line erosion rate, $D_1$ is any of the coastal line, bathymetric line or landform cross-section line at the time $T_1$; and $D_2$ is any of the coastal line, bathymetric line or landform cross-section line at the time $T_2$;

Two periods and times are used for calculation, and data with the biggest time span are used; calculating one-variable linear best trend line corresponding to all the data with the least squares method of the linear regression method, and a slope of the line is the conventional condition coastal erosion rate; v is a position of the coastal line, bathymetric line or the landform cross-section line, x is a known initial position of the coastal line, bathymetric line or the landform cross-section line, wherein a calculation equation of the conventional condition coastal erosion rate is:

$$Y = a_0 + b_0 x;$$

$$\begin{bmatrix} i & \sum x_i \\ \sum x_i & \sum x_i^2 \end{bmatrix} \begin{bmatrix} a_0 \\ b_0 \end{bmatrix} = \begin{bmatrix} \sum y_i \\ \sum x_i y_i \end{bmatrix};$$

In the equation, $a_0$ is a fixed constant, and is obtained by one-variable linear intercept calculation; $b_0$ is the conventional condition coastal erosion rate; i is a number of periods of the data; $X_i^2$ is a multi-stage least square iterative estimation; $X_i$ is a position of the coastal line, bathymetric line or landform cross-section line of the ith period; and $y_i$ is a position of the coastal line, bathymetric line or landform cross-section line of the ith period to be calculated.

In an embodiment of the present invention, in the step S2, determining and calculating the coastal erosion disaster early warning line comprises the following steps:

Step 1, calculating and determining an initial position of the coastal line and a position of the coastal erosion early warning line $S_N$ in N years.

Depending on different kinds of sea shores and landforms, the base line can be selected from a high tide line, a boundary line of coastal cliffs, a vegetation line or other significant landforms. For the base line, changes of coastal forms shall be visible, while there shall not be short term changes (one tidal section) and middle term changes (seasonal). Defining the base line to be $S_0$ (the position of the coastal line at the time of 0). The position of the coastal line in N years in conventional conditions can be obtained by multiplying the coastal line evolution rate with time.

Exemplarily, the coastal erosion early warning line after coastal erosion for N years, is subjected to limit of early warning time, including usually erosion development early warning in five years, ten years, twenty-five years, fifty years or one hundred years. For the SER of a natural coast, usually there are three possibilities: erosion (coastal line retreat); stability (dynamically stable (SER is approximate to 0)); and siltation (landward sea movement). A slow retreat rate of hard rocky coast can be regarded as stable.

Exemplarily, hereinafter an exemplary explanation will be given to determination of the coastal erosion early warning line in fifty years, and for the determination method of the coastal erosion early warning line in five years, ten years, fifty years and one hundred years the technical solution in the present invention can also be used.

The coastal erosion early warning line in 50 years for an erosion coastal section is:

$$S_N = S_0 + SER \times N;$$

In the equation, $S_0$ is the position of the coastal line at the time of 0; SER is the coastal erosion rate; $S_N$ is the position of the coastal line estimated when the coast evolves for N years as per a certain rate; and N is a number of years.

For coasts with dynamically stable coast lines or siltation, the coastal erosion early lines are maintained at the original base lines, and for the most inshore positions of the coastal lines estimated for the following N years, a method assuming the worst conditions is used. According to the method, the main influencing factors of changes of the coastal lines for a long term do not change in fifty years.

Step 2, calculation and determination of the coastal erosion early warning line under influence of accelerated sea level rise ($S_{Nc}$).

As the coastal retreat rate is subjected to the influence of sea level rise, the coastal line retreat $S_N$ obtained in the step 1 has already included the trends and effects of sea level rise. However, $S_N$ has not taken into consideration accelerated sea level rise in the coming N years. And accelerated sea level rise as a change that may affect the early warning shall be reckoned on rather than neglected. And modification of additional coastal erosion due to accelerated sea level rise can be realized. Given the current sea level rise rate $SLR_p$, an estimated value of sea level rise $SLR_N$ of a certain region, an adjustment value due to accelerated sea level rise ($SLR_a$) can be calculated, wherein the calculation formula is:

$$SLR_a = SLR_N - SLR_p \times N;$$

In the formula, $SLR_a$ is the adjustment value of accelerated sea level rise rate, $SLR_N$ is the estimated value of sea level rise in the coming fifty years; $SLR_p$ is the current sea level rise rate and N is the number of year;

When the sea level rise trend remains unchanged in the future N years, a calculation formula of the coastal line retreat value $R_a$ is:

$$R_a = \frac{SLR_a \times L}{h + D};$$

In the formula, $R_a$ is the coastal line retreat value, L is a horizontal distance measured in a cross section of a moving beach, h is a measured depth of the beach sediment in a wave field, and D is a measured height of a beach berm;

And obtaining the coastal erosion early warning line $S_{Nc}$ by the following equation:

$$S_{Nc} = S_N + R_a;$$

In the equation, $S_{Nc}$ is the coastal erosion early warning line, $S_N$ is a landward retreat distance from $S_0$; and $R_a$ is a coastal line retreat value.

Exemplarily, determination and calculation of the coastal erosion early warning line in the coming N years (fifty years for example) in three different conditions (siltation, dynamic stability and erosion), determination of the position of the coastal line; adjustment of the accelerated sea level rise; influence of extreme storm waves.

Figure 2:
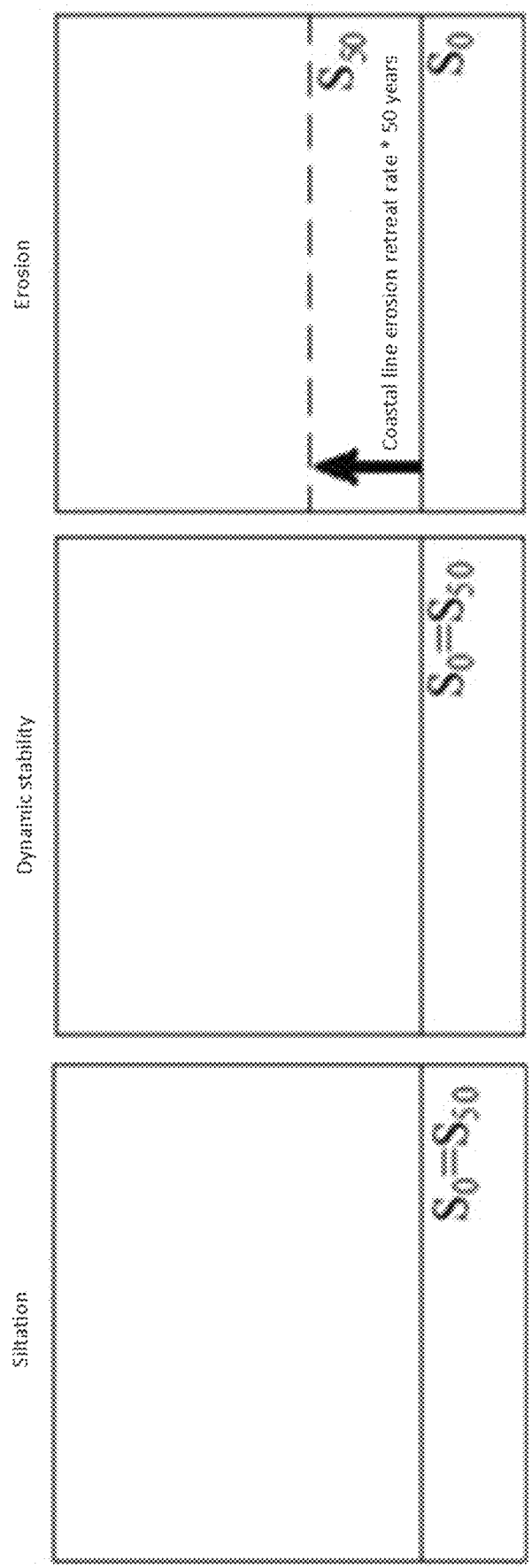
FIG. 2 is a diagram showing a shoreline position among the coastal erosion disaster early warning lines in N years in three conditions, namely, siltation, dynamic stability and erosion according to an embodiment of the present invention.

Wherein, in FIG. 2 a diagram showing the position of the coastal line among the coastal erosion early warning line in N years (fifty years for example) in three conditions, namely, siltation, dynamic stability and erosion;

When the coastal erosion rate is 0 or the coastal is in condition of siltation or dynamic stability, the position of the coastal erosion early warning line in the coming fifty years and the coastal line in condition of dynamic stability, $S_{50} = S_0$.

Figure 3:
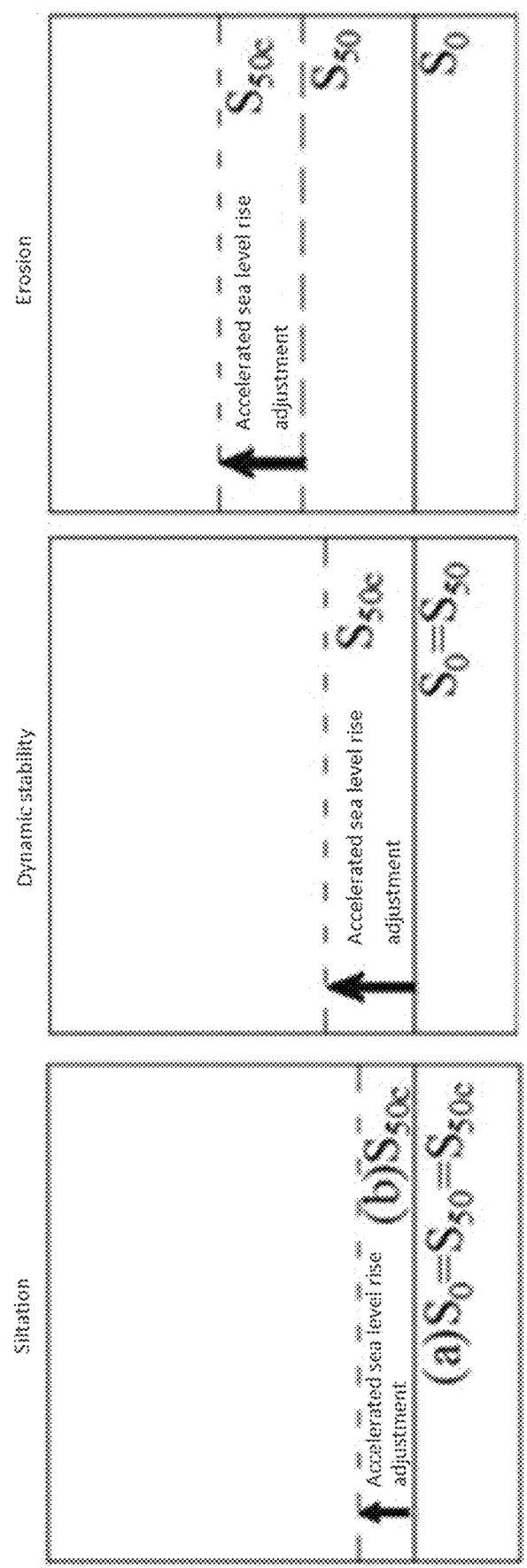
FIG. 3 is a diagram showing modification of the coastal erosion disaster early warning lines in N years with accelerated sea level rise in three conditions, namely, siltation, dynamic stability and erosion according to an embodiment of the present invention.

In FIG. 3 the adjusted position of the coastal erosion early warning line in N year (fifty years for example) in conditions of siltation, dynamic stability and erosion under condition of accelerated sea level rise; during siltation, the siltation rate in condition (a) is bigger than the influence of accelerated sea level rise and in condition (b) the influence of accelerated sea level rise is bigger than the siltation rate.

Take as an example the coastal erosion early warning line in the coming fifty years. For the coastal lines in dynamic stability, $S_{50} = S_0$, and the landward distance of the coastal erosion early warning line adjusted in consideration of accelerated sea level rise is equal to $R_a$. For the beach section with siltation, when the estimated seaward movement value of the coastal line is bigger than the landward movement distance due to accelerated sea level rise, $S_{50}$ is staill maintained at $S_0$ (a position of the coastal line that is the most close the land in the fifty years); and when the erosion amount $R_a$ due to accelerated sea level rise (ASLR) is bigger than predicted seaward displacement of the coastal line in the fifty years, the adjustment formula of the coastal erosion is:

$$S_{50c} = S_0 + R_a - S_{50s};$$

In the formula, $S_{50c}$ is a position of the coastal erosion early warning line with a bigger retreat amount; $S_0$ is an initial position of the coastal line; $R_a$ is an erosion amount caused by ASLR; and $S_{50s}$ is a seaward displacement of the coastal line in the fifty years.

By the foregoing steps and processes, assuming the coastal line evolution rate is equal to the recent coastal line evolution rate, by adding the additional erosion amount due to accelerated sea level rise, after this, the position of the coastal erosion early warning lines in the next fifty years can be obtained.

Figure 4:
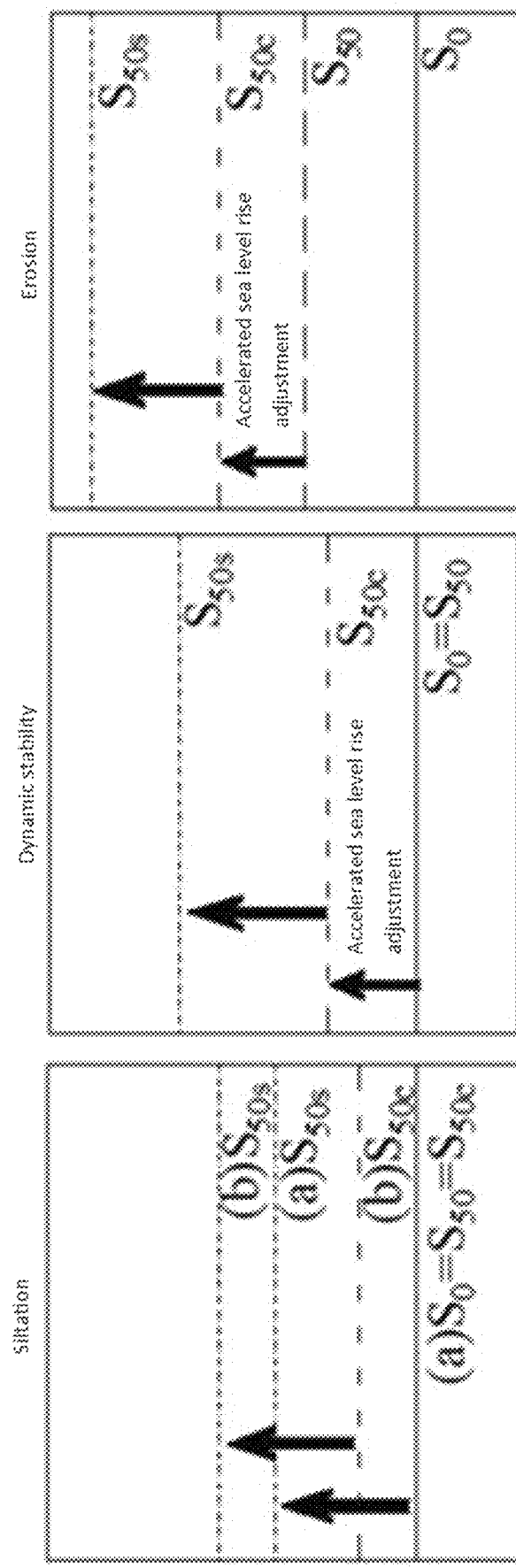
FIG. 4 is a diagram showing influence of the heaviest storm on the coastal erosion disaster early warning lines in N years in three conditions, namely, siltation, dynamic stability and erosion according to an embodiment of the present invention.

In FIG. 4 a diagram showing the coastal erosion early warning line in N years (50 years for example) in conditions of siltation, dynamic stability and erosion under influence of the heaviest storms is shown.

In conditions of siltation, dynamic stability and erosion, the determination and calculation method of the position of the coastal erosion early warning line in the next N years.

Step 3, determination and calculation of the coastal erosion early warning line ($S_{Ns}$) under influence of extreme storms.

Extreme occurrences of storm waves can generally cause severe erosion and retreat of the coastal lines, and as an important influencing factor, during conducting determination and calculation of the coastal erosion early warning line, on the basis of long-term coastal evolution, influence of the factor of storm waves shall be included.

For the erosion early warning lines ($S_N$ and $S_{Nc}$) average influence of storms in the coming N years including short term changes of the coastal lines are analyzed, as after storm actions usually the beaches will make self-adjustment and recover. However, the coastal erosion early warning line is determined to find the position of the coastal line in the coming N years and also to determine a spatial scope that coastal erosion disaster may occur, therefore, the worst conditions under the influence of extreme storms shall be accounted. By analyzing possible short-term coastal line retreat and overflow of waves caused by extreme storms, further adjustment can be made to the calculated coastal erosion early warning line.

Estimating coastal line retreat due to extreme storms, wherein the formula is:

$$l = HS\left(\frac{t_d}{12}\right)^{0.3};$$

In the formula, l is the amount of coastal line retreat due to extreme storm waves with a unit of ft; H is a measured and calculated wave height with a unit of ft; S is a measured and calculated storm surge with a unit of ft; td is a measured and calculated storm duration with a unit of h.

Select the biggest wave height, storm surge and duration caused by storm waves as the values of the possible biggest storm waves in the coming fifty years to calculate the coastal line retreat amounts under the biggest storm of different coastal beaches.

By the foregoing method, the coastal line retreat value l due to periodic storms in N years can be obtained, and adding to the coastal erosion early warning line $S_{Nc}$ in N years and obtaining the coastal erosion early warning line considering the storm waves:

$$S_{Ns}=S_{Nc}+l;$$

In the equation, $S_{Ns}$ is a position of the coastal erosion early warning line with presence of storm waves, $S_{Nc}$ is a position of the coastal line after ASLR adjustment and l is a calculated coastal retreat value caused by periodic storms in N years.

The extreme storm may occur at any time during the N years, to ensure proper erosion early warning, as per the worst possible conditions, the coastal line retreat amount is increased to the landward direction of the position of the coastal line (as per FIG. 4).

By the foregoing steps, several elements required for determining the coastal erosion early warning line are obtained: $S_0$ (the position of the coastal line at the time of 0); $S_N$ (an estimated position of the coastal line assuming the coast to evolve for N years at a certain rate); $S_{Nc}$ (the position of the coastal line after ASLR adjustment); and $S_{Ns}$ (the position of the coastal erosion early warning line with presence of storm waves). In this way, determination and calculation of coastal erosion early warning lines under extreme storm wave conditions can be done.

Figure 5:
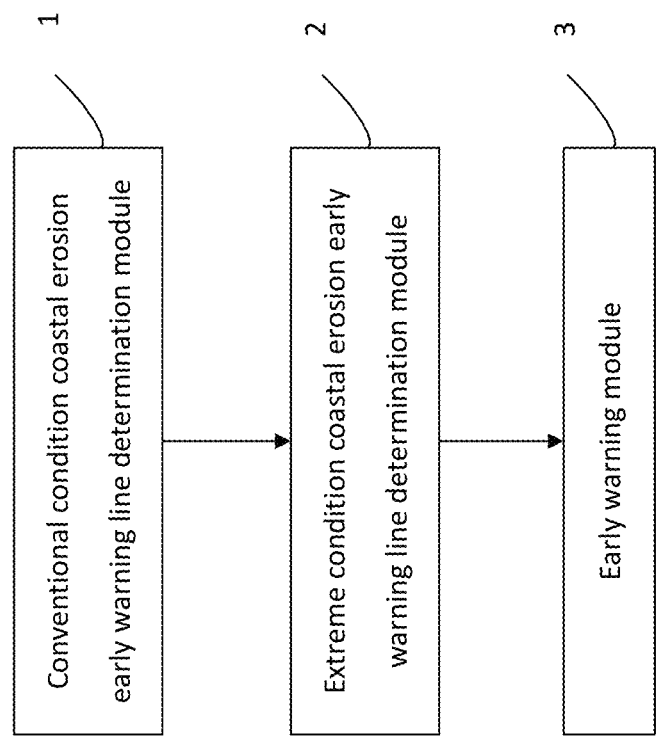
FIG. 5 is a diagram showing a system for determining coastal erosion disaster early warning lines and calculating spatial scope thereof according to an embodiment of the present invention.

Embodiment 2, as shown in FIG. 5, an embodiment of the present invention provides a system for determining coastal erosion disaster early warning lines and calculating spatial scope thereof, wherein the system comprises:

A conventional condition coastal erosion early warning line determination module 1, configured to calculate the coastal erosion early warning lines in the coming N years in conventional conditions utilising the coastal erosion rate calculation method according to coastal erosion change monitoring and landform data, and determining the conventional condition coastal erosion rate;

An extreme condition coastal erosion early warning line determination module 2, configured to determine the coastal erosion early warning lines in the coming N years in extreme conditions under influence of accelerated sea level rise and extreme storms utilizing the determination and calculation method of the coastal erosion disaster early warning lines; and An early warning module 3, configured to obtain the coastal erosion retreat position and scope and send early warning based on the conventional condition coastal erosion early warning lines and the extreme condition coastal erosion early warning lines.

In an embodiment of the present invention, the conventional condition coastal erosion early warning line determination module 1, comprises:

A coastal erosion change data extraction module, configured to extract coastal line change and beach corrosion data.

A coastal line change rate calculation module, configured to calculate the coastal erosion rate by the end-point method or the linear regression method.

In an embodiment of the present invention, the coastal erosion disaster early warning determination and calculation module comprises:

A coastal erosion early warning line $S_N$ position calculation and determination module, configured to locate an initial position of the coastal line and locate and calculate a position of the coastal erosion early warning line $S_N$ in the coming N years.

A coastal erosion early warning line determination and calculation module under influence of accelerated sea level rise, configured to measure the coastal erosion early warning line ($S_{Nc}$).

A coastal erosion early warning line determination and calculation module under influence of extreme storms, configured to acquire elements required for finding the coastal erosion early warning lines: $S_0$ (a position of the coastal line at a time 0); $S_N$ (a predicted position of the coastal line in the coming N years assuming the coast evolves for N years at a certain rate); $S_{Nc}$ (a position of the coastal line after ASLR adjustment); and $S_{Ns}$ (a position of the coastal erosion early warning line with occurrence of storm waves) so as to complete determination and calculation of the coastal erosion early warning lines under condition of extreme storms.

In the foregoing embodiments, description of the embodiments have different emphasises, and for those not set forth in detail in an embodiment, please refer to corresponding description in other embodiments.

Contents with respect to information interaction, execution processes of the devices/units have not been repeated here as these contents are based on the same technical idea as that of the method embodiment of the present invention, and for specific functions and technical effects thereof, please refer to the corresponding portion in the method embodiment.

Those skilled in the art can clearly appreciate that, to ease description, for division of functional units and modules some examples have been given, and during actual application, the functions can be assigned to different functional units and modules as required, that is, the internal structure of the device can be divided to be different functional units or modules so as to complete all or some functions described in the foregoing paragraphs. In the embodiments, the functional units and modules can be integrated in a processing unit or each of the units may exist alone, also two or more units can be integrated in a unit and the integration can be realized in the form of hardware and also in the form of software functional units. Further, specific descriptions of the functional units and modules are given for the purpose of mutual differentiation, rather than limit the protection scope of the present invention. And for specific working processes of the units and modules in the system please refer to the corresponding processes set forth in the method embodiment.

Based on the foregoing technical solutions recited in the embodiments of the present invention, the following application embodiment is proposed.

According to the embodiments of the present invention, the present invention further provides a computer device, wherein the computer device comprises: at least one processor, at least one memory and a computer program stored in the at least one memory that can be run by the at least one processor, wherein the computer program can realize the steps in the foregoing method embodiments when being executed by the at least one processor.

An embodiment of the present invention provides a computer readable storage medium, wherein a computer program is stored in the computer readable storage medium and the computer program when being executed by a processor will realize the steps set forth in the method embodiments.

An embodiment of the present invention provides an information data processing terminal, wherein the information data processing terminal is configured to provide a user input interface to execute the steps as set forth in the method embodiments when being executed in an electronic device, and the information data processing terminal is not limited to cell phones, computers and switches.

An embodiment of the present invention further provides a server, wherein the server when being executed on an electronic device, will provide a user input interface to execute the steps as recited in the method embodiments.

An embodiment of the present invention further provides a computer program product, and the computer program product when being run on an electronic device will have the electronic device to execute the steps in the method embodiments.

The integrated units when being realized in the form of software functional units and being sold or used as an independent product, can be stored in a computer readable storage medium. Based on this understanding, all or some of the processes of the method as recited in the foregoing embodiments of the present invention can be completed by instructing corresponding hardware with a computer program, wherein the computer program can be stored in a computer readable storage medium, and the computer program when being executed by a processor, will realize the steps as set forth in the method embodiments of the present invention. Wherein, the computer program comprises codes for the computer program, wherein the codes of the computer program can be in the form of source codes, object-oriented codes, executable files or some intermediate files. The computer readable medium comprises at least: any entity or device that can transmit the codes for the computer program to a photographic device/terminal device, a recording medium, a computer memory, a read-only memory ROM, a random access memory RAM, electronic carrier wave signals, telecommunication signals and software distribution media. For example, U disks, mobile hard disks, magnetic disks or optical disks.

Descriptions of the foregoing embodiments have different emphasises, and for those not given in detail or omitted in any embodiment, corresponding description in other embodiments can be found.

To further establish the positive effects of the foregoing embodiment, in the present invention the following experiment was done based on the foregoing technical solutions: to verify the effectiveness of the present invention, experiments of the determination and calculation method of the coastal erosion early warning lines recited in the present invention have been done for verification in different types of erosion coastal sections, for example, sandy and silt beaches. Hereinafter verification of the determination and calculation method of the coastal erosion early warning lines were done taking as an example the erosion beach of an island to find the coastal erosion early warning lines of the erosion beach section of the island. And to reduce risks and ensure disaster prevention and management effects, higher coastal erosion early warning indicators and parameters were selected instead of lower ones. The coastal line retreat rate is 4 m/a and the beach corrosion rate is 0.66 m/a.

(1) Determining and locating an initial coastal line and locating a position thereof $S_0$: according to geological features of the erosion section of the island and in view of the landform and investigation and observation of the surrounding environment, selecting a coastal dune toe line, wherein the coastal dune toe line can reflect changes of different dynamic landforms of the coast, with no presence of short term changes, taking as a reference outer vegetation edge line, and outlining the position of the initial coastal line $S_0$ (the first curve in FIG. 5 close to the coastal line);

(2) Determination and calculation of the coastal erosion early warning and retreat lines in different time scales ($S_{50}$): calculating the coastal erosion retreat rate of the coast according to the calculation method of the coastal erosion rate (conventional condition coastal erosion rate). As per the coastal erosion investigation and monitoring results, the coastal erosion rate is 0.8 m/a and calculating a position of the coastal erosion retreat lines at different time scales. In the present invention, the coastal erosion early warning lines were determined and calculated in a time scale of 50 years, and a retreat distance of the coastal line in 50 years is 40 m and the coastal erosion retreat line $S_{50}$ in 50 years was determined.

(3) Determination and calculation of a position of the coastal erosion early warning lines under influence of accelerated sea level rise ($S_{50c}$): in the present region, the sea level appears to fluctuate and rise generally with an annual rise rate of 3.2 mm/a, and the sea level rise value in 50 years is 30 cm, and the adjustment value of the sea level rise rate ($S_{LRa}$) is 14 cm. In the monitoring region three cross-sections were drafted to reflect changes of landforms of the coast, and for other beach sections weighted intermediate clearance was used for calculation. In between an upper limit and a lower limit of the moving beach from the beach berm to the surf zone where the slope is reduced, by multiple repeated measurement L and h of different sections were determined. Measured and estimated values of the sections and calculated value of $R_a$ are recorded in Table 1, wherein erosion retreat values of the sections are used to represent the erosion retreat values of neighboring beach sections.

TABLE 1

Summary of parameters reflecting basic
landforms of different cross-sections and retreat
values caused by accelerated sea level rise

| Section no. | L(m) | H(m) | D(m) | $R_a$(m) |
|---|---|---|---|---|
| P1 | 85 | 4.2 | 1.0 | 2.29 |
| P2 | 60 | 4.0 | 1.5 | 1.53 |
| P3 | 90 | 4.1 | 1.5 | 2.25 |

(4) Determination and calculation of the coastal erosion early warning lines ($S_{50s}$) under influence of extreme storms As per conditions of storms in the region in historical periods, it is found that the biggest wave height is 6.1 m, the storm surge is 4.63 m, and the duration is 8 h, therefore it is calculated that the coastal line retreat amount l caused by the biggest storm in the coming 50 years is 25.0 m and thus the coastal line erosion early warning line $S_{50s}$ under influence of extreme storms in the coming 50 years were calculated.

The foregoing are only preferred embodiment of the present invention, however, the protection scope of the present invention is not limited to these embodiments, all modifications, equivalent replacement and improvements made within the spirit and principles of the present invention and in the technical scope disclosed in the present invention by those skilled in the art shall be covered in the protection scope of the present invention.

The invention claimed is:

1. A method for determining coastal erosion disaster early warning lines and calculating spatial scope thereof comprises specifically the following steps:

S1, determining a coastal erosion rate according to coastal erosion change monitoring data and landform data; and calculating at least one coastal erosion early warning line in coming N years in conventional conditions according to an established coastal erosion rate calculation method;

S2, determining the at least one coastal erosion early warning line in N years in extreme conditions by increasing influencing factors of accelerated sea level rise and extreme storm waves and utilizing a determination and calculation method of coastal erosion disaster early warning lines; and S3, obtaining a coastal erosion retreat position and scope and sending early warning based on the coastal erosion rate in conventional conditions and the at least one coastal erosion early warning line in extreme conditions;

wherein in the step S1 the established coastal erosion rate calculation method comprises:

(1) coastal erosion disaster data extraction: conducting extraction for data regarding changes of coastal lines and beach corrosion; and (2) coastal line change rate calculation: analyzing temporal changes of positions of the coastal lines by superposition comparison of multi-stage changes of the coastal lines or changes of elevations of mudflats, and calculating the coastal erosion rate in the conventional conditions by end-point methods or linear regression methods;

wherein in the step (1) coastal erosion disaster data extraction comprises: taking cross-section lines perpendicular to the coastal lines as base lines, and reading positions of intersecting points of the base lines with the coastal lines in different periods, or measuring and obtaining distances between the coastal lines and monitoring signs;

and extraction of the data regarding the changes of beach corrosion comprises: taking an intertidal belt or an offshore slope to be a reference, drafting vertical lines downwards, reading respectively positions of intersecting points between the vertical lines and cross-section landform lines in the different periods; and in case water depths and landforms are digital elevation model (DEM), and extracting a topographical profile graph by being perpendicular to directions of the coastal lines;

wherein in the step (2) coastal line change rate calculation comprises: determining the multi-stage changes of the coastal lines in different periods and times, when data of the coastal lines or the landform data in less than six stages are collected, calculating the coastal erosion rate by the end-point methods; and when the data of the coastal lines or the landform data in six or more stages are collected, calculating the coastal erosion rate by the linear regression methods;

wherein calculating the coastal erosion rate by the end-point methods comprises calculating the coastal erosion rate in conventional conditions by comparison of position changes taking use of data of the positions of the coastal lines in two different periods, wherein a calculation method is:

$$SER = \frac{D_1 - D_2}{T_1 - T_2};$$

in the above equation, SER means coastal erosion rate, $D_1$ means any of coastal line and bathymetric line or cross-section landform line at a time $T_1$; and $D_2$ means any of the coastal line, the bathymetric line or the cross-section landform line at a time $T_2$;

for the linear regression methods, a one-variable linear best trend line corresponding to all the data is obtained by the least squares method, a rate of slope of the one-variable linear best trend line is the coastal erosion rate in the conventional conditions; y is a position of the coastal line, the bathymetric line or the cross-section landform line to be calculated, x is a known initial position of the coastal line, the bathymetric line or the cross-section landform line and a calculation formula of the coastal erosion rate in the conventional conditions are:

$$y = a_0 + b_0 x;$$

$$\begin{bmatrix} i & \sum x_i \\ \sum x_i & \sum x_i^2 \end{bmatrix} \begin{bmatrix} a_0 \\ b_0 \end{bmatrix} = \begin{bmatrix} \sum y_i \\ \sum x_i y_i \end{bmatrix};$$

in the formula, $a_0$ is a fixed constant and is obtained by one-variable linear intercept calculation; $b_0$ is the coastal erosion rate in the conventional conditions; i is a number of stages of the data; $x_i^2$ is a multi-stage least square iterative estimation; $X_i$ is a position of the ith stage coastal line, bathymetric line or cross-section landform line and $y_i$ a position of the ith stage coastal line, bathymetric line or cross-section landform line to be calculated;

wherein in the step S2, the method for determining and calculating coastal erosion early warning lines comprises the following steps:

step 1, determining an initial position of the coastal lines and calculating and determining positions of the coastal erosion disaster early warning lines $S_N$ in N years; calculating the coastal erosion disaster early warning lines in extreme conditions, which is obtained by calculating the coastal erosion disaster early warning lines in conventional conditions and increasing influencing factors of sea level rise and extreme storm waves;

step 2, calculating and determining the at least one coastal erosion early warning line $S_{Nc}$ under influence of accelerated sea level rise; and step 3, determining and calculating the at least one coastal erosion early warning line $S_{Nc}$ under influence of extreme storm waves.

2. A system for determining coastal erosion early warning line and calculating spatial scope thereof, wherein the method for determining coastal erosion early warning line and calculating spatial scope thereof as recited in claim 1 is executed, with the system the method for calculating the coastal erosion rate is determined, and a calculation method of the at least one coastal erosion early warning line in conventional conditions and extreme conditions is quantitatively determined, wherein the system comprises:

a conventional condition coastal erosion early warning line determination module (1), configured to calculate at least one coastal erosion early warning line in N years in conventional conditions according to coastal erosion change monitoring and landform data and with the method for calculating the coastal erosion rate, and determining the coastal erosion rate in conventional conditions;

an extreme condition coastal erosion early warning line determination module (2), configured to determine at least one extreme condition coastal erosion early warning line being subjected to accelerated sea level rise and extreme storm waves with the method for determining coastal erosion disaster early warning lines and calculating spatial scope thereof; and an early warning module (3), configured to obtain a coastal erosion retreat position and scope based on the at least one coastal erosion early warning line in conventional conditions and the coastal erosion early warning line in extreme conditions and sending early warning.

* * * * *